Aug. 5, 1930.        J. W. CAIN        1,772,337
COMBINED REAR, TAIL, AND STOP LIGHT
Filed Aug. 27, 1926        2 Sheets-Sheet 1
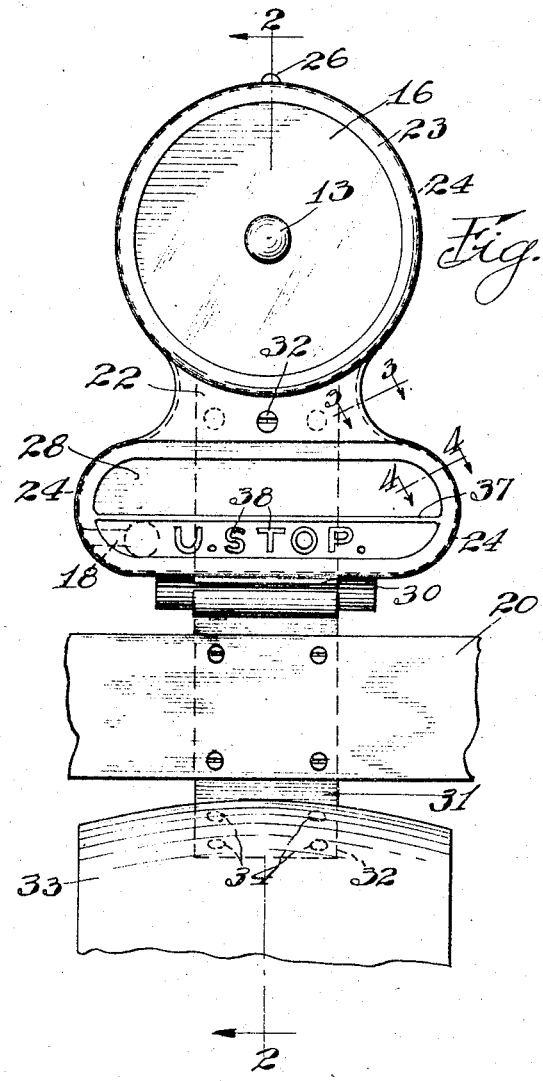
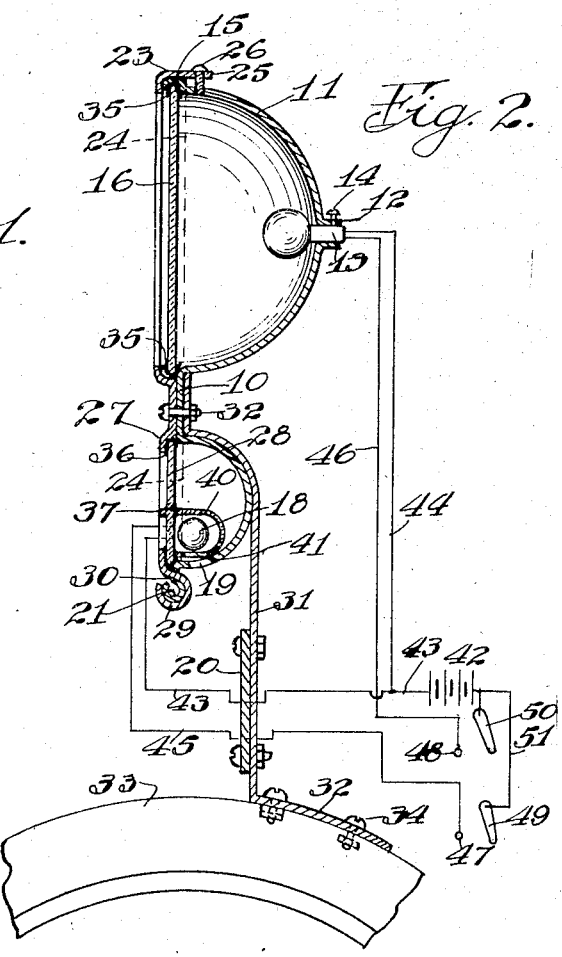
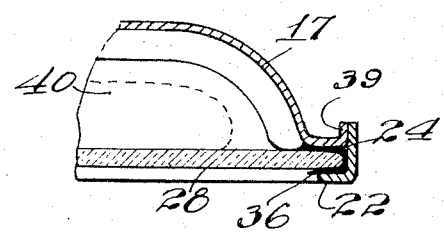
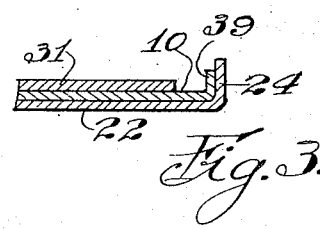
INVENTOR.
JAMES W. CAIN.
BY Albert E. Bell
ATTORNEY.

Aug. 5, 1930.  J. W. CAIN  1,772,337
COMBINED REAR, TAIL, AND STOP LIGHT
Filed Aug. 27, 1926  2 Sheets-Sheet 2
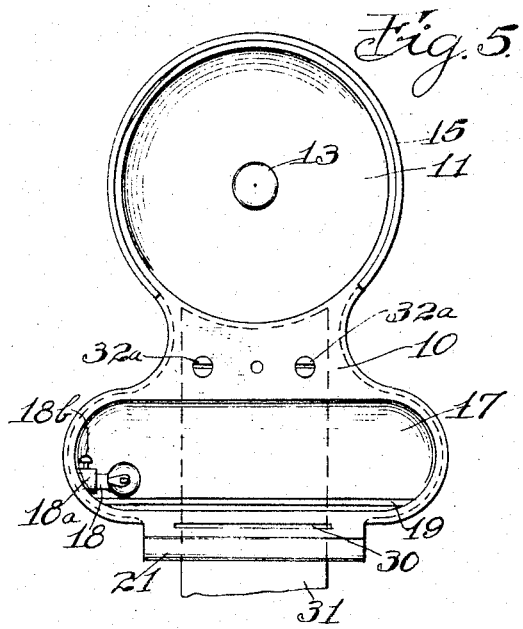
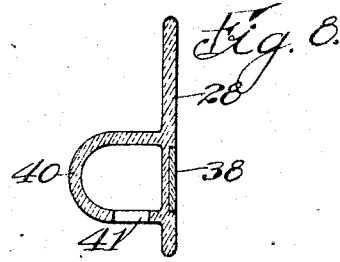
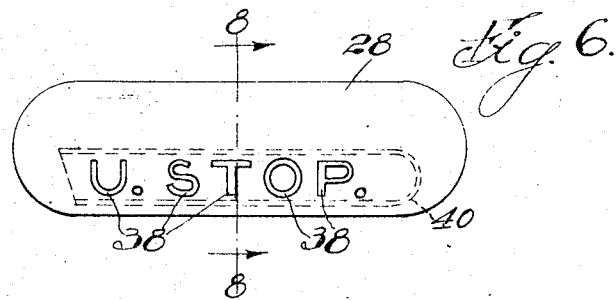
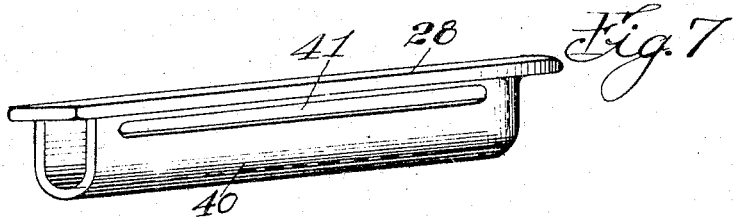
INVENTOR.
JAMES W. CAIN.
BY Albert C. Bell
ATTORNEY.

Patented Aug. 5, 1930

1,772,337

UNITED STATES PATENT OFFICE

JAMES W. CAIN, OF DETROIT, MICHIGAN

COMBINED REAR, TAIL, AND STOP LIGHT

Application filed August 27, 1926. Serial No. 131,829.

My invention relates to an improved construction of tail light for vehicles, in which I combine in the same structure a rear light for illuminating purposes, a tail light of conventional indication and a stop light, the structure further including a special mounting bracket for supporting a license plate to be illuminated by light from the device. By my invention I illuminate the tail light, the stop light and the license plate by a single lamp without the use of metal partitions forming various light compartments, my improved result being secured by a special lens construction which is preferably formed integrally with the light transmitting plate forming the tail light and stop light indications, as a result of which the housing of the device, including the rear light for illuminating purposes, consists of but two metal stampings, each of simple construction, readily assembled to form the complete structure, so that the entire construction is at once effective and cheap.

My invention will best be understood by reference to the accompanying drawings showing a preferred embodiment thereof in which Fig. 1 shows in rear elevation my combined rear light, tail light, stop light and license plate illuminator mounted in place on a fender of a vehicle, Fig. 2 is a vertical sectional view of the parts shown in Fig. 1 taken along the line 2—2 of that figure, Fig. 3 is a detail sectional view to an enlarged scale of a part of the construction shown in Fig. 1 taken along the line 3—3, Fig. 4 is a detail sectional view to an enlarged scale of a part of the construction shown in Fig. 1 taken along the line 4—4, Fig. 5 shows in a view similar to Fig. 1, the back plate or member of my device, secured to the upper end of its supporting bracket, Fig. 6 shows in a view similar to Fig. 1 and to an enlarged scale the construction preferably used to afford the tail light and stop light indications, Fig. 7 is a bottom perspective view of the construction shown in Fig. 6, and Fig. 8 is a sectional view of the parts shown in Fig. 6 taken along the line 8—8.

Similar numerals refer to similar parts throughout the several views.

As shown in Fig. 2, my device consists of a back plate 10 in the upper part of which a hemispherical cup 11 is formed, from which cup a tubular portion 12 projects outwardly centrally of the cup to form a support for an electric lamp 13, which may be moved longitudinally in said tubular portion 12 to secure the proper position for effectively distributing the light from the lamp, in which position the lamp may be clamped by a set screw 14. The edge portion of the cup 11 is crimped for somewhat more than half of its periphery as indicated at 15 to form a support for a transparent disk or pane 16 used to close the cup 11. The pane 16 may be made of glass, celluloid or other light transmitting material and is preferably clear so that white light will be projected from this device when the lamp is lighted, to afford a convenient means for rear illumination when it is desired to move the vehicle backwards in poorly lighted places. The inside of the cup 11 may be plated and polished if desired to constitute a reflector for light rays from the lamp 13.

Below the cup 11, the back plate is flat for a short distance and below the flat portion it has formed therefrom a projecting semi-cylindrical wall 17, to form a compartment for limiting and directing the light delivered by the tail lamp 18. As shown in Fig. 5, the lamp 18 is mounted in a tubular socket 18a extending inwardly from the member 10 and a set screw 18b is provided to hold the lamp 18 in any desired adjustment. Through the lower portion of the wall of the compartment 17, a slot 19 is formed to direct light from the lamp 18 upon a license plate 20, as indicated in Fig. 2. The back member 10 is continued downwardly a short distance below the compartment 17 and provided with a rolled edge as indicated at 21 for a purpose to be described, said rolled edge extending substantially horizontally and parallel to the plane of the back member 10. The front member 22, constituting the other part of the housing of the device is also preferably formed from sheet metal and consists at its upper part of a flanged ring 23, the flange 24 from which extends around the crimped edge 15 of the cup 11, the ear 25 preferably extending beyond said flange at the upper part of the ring to receive a retaining screw 26 threaded into the cup 11 to hold the parts 10 and 22 together at their upper portions.

Below the flanged ring 23, the part 22 extends for a short distance in substantially flat condition adjacent the flat part of the back member 10 and is then formed with an offset flange 27 for engaging the edge of the closing member 28 of the compartment 17, below which the front member is provided with a rolled edge 29 extending through a slot 30 in the lower part of the back member 10, to surround the lower rolled edge 21 of the back member 10 to form a hinge connection with said member.

The flange 24 is preferably extended downwardly across the edges of the flat portion of the member 22 and across the ends of the compartment 17 to the rolled lower edge 29 of said member 22, to securely retain the member 28 in place and afford a finish for the device.

As indicated in Fig. 2, the flat portions of the members 10 and 22 are secured together and to the upper end of a bracket 31, for example by bolts 32, the bracket being bent to clear the compartment 17, from which it is extended downwardly to support the license plate 20 by suitable bolts as indicated, and below the license plate it may be given any convenient form to engage a desired supporting surface, for example, by bending it at an angle to the upwardly extending part of the bracket, as indicated at 32, which part of the bracket may be secured to a desired support, for example a vehicle fender 33 by suitable screws or bolts 34.

To cushion the pane 16 and member 28, I prefer to place paper gaskets 35 and 36 around their edges so as to decrease the liability of their breaking.

As shown in Fig. 1, the member 22 of the device is formed with a cross band 37 across the sight opening through said member in line with the compartment 17, which cross band divides the sight opening into two parts. The member 28 is preferably transparent or light transmitting and red in color so that the light delivered from the sight opening above the band 37 will be a plain red light giving the usual tail light indication for the vehicle, while the part of the member 28 below the band 37 and in line with the part of the sight opening below the band 37, is preferably provided with letters or indications, as shown at 38 constituting a "stop" indication, for example, the indication "U. stop" may be used with good results. The member 28 may be made of glass, celluloid, or any other light transmitting material.

As indicated in Figs. 3 and 4, the edges of the flat portion of the member 10 and the wall of the compartment 17 have referably projecting from them flanges 39 adjacent the flanges 24, to stiffen the member 10 and make a better fit between the two parts of the device.

As indicated in Figs. 1 and 5, screws or bolts 32ª are preferably used to secure the back member 10 of my device to the bracket 31 with the outer member 22 of the device in its open position, so that the device may be securely held in place when for any reason it is necessary to move the outer member 22 to its open position. The inner surface of the compartment 17 may be plated and polished if desired to constitute a reflecting surface to aid in directing the light rays from the lamp 18 through the tail light opening, through the stop opening and to the license plate.

As indicated in Figs. 6, 7 and 8, the member 28 has formed on its inner surface and preferably integrally therewith a horizontally extending tubular portion 40 closed at one end as indicated and open at its other end to slip over the lamp 18 when the member 28 is put in place in the casing. A slot 41 is formed through the lower wall of the tube 40 in line with the slot 19 so that white light may be delivered directly from the lamp 18 through said slots 19 and 41 upon the license plate 20, although the member 28 and its integral tube 40 are preferably of clear red light transmitting material serving to permit only red light to be delivered from it. It will be noted that the inner portion of the tube 40 is of semi-cylindrical conformation and this has a lens action on the light rays delivered into the tube by the lamp 18 which tends to distribute the rays over the inner surface of the member 28 to uniformly illuminate it, and thus uniformly illuminate the tail light indication and the stop indication. The reflecting inner surface of the tube 40, further has the effect of distributing light rays longitudinally of the tube 40 so that substantially uniform illumination is projected through the slots 41 and 19 against the license plate 20.

It is important that the characters used for the stop indication shall be legible during the day time when the lamp 18 is not lighted and at night when the lamp 18 is lighted, and to this end I prefer to form the letters of the stop indication of a different kind of glass or material, from the body portion of the member 28, for example it may be white glass as distinguished from clear glass so as to present a white appearance either from light passing through the characters made from it, or from outside light falling upon said characters. I prefer to embody the stop letters thus formed in the material of the member 28 preferably by fusing the two materials together to constitute in effect an integral structure.

It will be understood that it is not intended to light the lamp 13, except when illumination is required behind the vehicle, for example when it is necessary to back the vehicle in the dark. On the other hand it is desirable that the lamp 18 shall be lighted at all times that artificial illumination is required to permit the vehicle to proceed in safety, or to comply with the road laws of the locality in which the vehicle is being used. To accomplish this result I preferably provide separate controls for lighting said lamps as indicated in Fig. 2. In that figure, a source of current is illustrated at 42, which may be a battery or any equivalent source, one terminal of which is connected by wires 43 and 44 with one terminal of each of the lamps 18 and 13 respectively; the other terminals of the lamps are connected respectively by wires 45 and 46 with contacts 47 and 48; switches 49 and 50 have their pivotal points connected together by wire 51 and thereby are connected with the other terminal of the source of current 42, these switches serving to engage the contacts 47 and 48 respectively when they are moved to their closed position. In this manner the lighting of the lamp 18 is controlled by the switch 49 and the lighting of the lamp 13 is controlled by the switch 50.

While I have described members 10 and 22 as being made of sheet metal, it will be understood that they may be made of any material or metal adapted to meet the requirements described. I find it preferable however, to make them of sheet metal by means of suitable punches and dies on account of the relative cheapness of such operations. In making them of sheet metal, it will be understood that the metal may be of any desired kind, whether iron, steel, brass, aluminum or other material.

From the above it will appear that my device is simple and cheap in construction, that it is neat and compact in appearance, and that besides serving the function of a rear light for illuminating purposes as described, a single lamp serves the three purposes of illuminating the tail light, the stop light and the license plate of a vehicle.

While I have shown my invention in the particular embodiment above described, it will be understood that I do not limit myself to this exact construction as I may employ equivalents known to the art at the time of the filing of this application without departing from the scope of the appended claims.

What I claim is:

1. A casing for a tail light comprising the combination of two sheets of metal, one of said sheets having a plurality of separate lamp compartments drawn and distended from the same side of said sheet and the other of said sheets having apertures therethrough of substantially the size and shape of and in line with the open sides of said compartments respectively to hold light transmitting means across said apertures, a light transmitting pane of clear material for closing one of said compartments, and a light transmitting pane of colored material for closing the other of said compartments, said latter pane having an integral hollow lens extending into the corresponding compartment and open at one side to receive a lamp.

2. A casing for a tail light comprising the combination of two sheets of metal, one of said sheets having a plurality of separate lamp compartments drawn and distended from the same side of said sheet, and the other of said sheets having apertures therethrough of substantially the size and shape of and in line with the open sides of said compartments respectively to hold light transmitting means across said apertures, a light transmitting pane of clear material for closing one of said compartments, and a light transmitting pane of colored material for closing the other of said compartments, said latter pane having an integral hollow lens extending into the corresponding compartment and open at one side to receive a lamp, said hollow lens and the corresponding compartment being of semi-cylindrical cross-section.

3. A pane for a tail light comprising a sheet of light transmitting material having an integral hollow lens extending from one of its faces and open only at one point sufficiently to receive a lamp.

4. A pane for a tail light comprising a sheet of light transmitting material having an integral hollow lens extending from one of its faces and open only at one point sufficiently to receive a lamp, said hollow lens being of semi-cylindrical cross-section and having said opening through one of its ends.

In witness whereof, I hereunto subscribe my name this 23rd day of August, A. D. 1926.

JAMES W. CAIN.